United States Patent
Takii et al.

(10) Patent No.: US 10,969,312 B2
(45) Date of Patent: Apr. 6, 2021

(54) STRIKING DEVICE AND NATURAL FREQUENCY MEASURING DEVICE

(71) Applicants: SHIMADZU CORPORATION, Kyoto (JP); Osaka Research Institute of Industrial Science and Technology, Osaka (JP); City of Nagoya, Nagoya (JP); AKITA PREFECTURE, Akita (JP)

(72) Inventors: Tadaoki Takii, Kyoto (JP); Masaki Nishimura, Osaka (JP); Satoshi Taniguchi, Nagoya Aichi Pref. (JP); Mitsuhiko Kimura, Akita (JP); Norifumi Kasai, Tokyo (JP)

(73) Assignees: SHIMADZU CORPORATION, Kyoto (JP); Osaka Research Institute of Industrial Science and Technology, Osaka (JP); City of Nagoya, Nagoya (JP); AKITA PREFECTURE, Akita (JP)

( * ) Notice: Subject to any disclaimer, the term of this patent is extended or adjusted under 35 U.S.C. 154(b) by 39 days.

(21) Appl. No.: 16/248,809

(22) Filed: Jan. 16, 2019

(65) Prior Publication Data
US 2019/0234846 A1 Aug. 1, 2019

(30) Foreign Application Priority Data
Jan. 26, 2018 (JP) .............................. JP2018-011638

(51) Int. Cl.
*G01N 3/00* (2006.01)
*G01N 3/04* (2006.01)
(Continued)

(52) U.S. Cl.
CPC ................ *G01N 3/04* (2013.01); *G01M 7/08* (2013.01); *G01N 3/08* (2013.01); *G01N 3/10* (2013.01);
(Continued)

(58) Field of Classification Search
CPC .. G01N 3/04; G01N 3/08; G01N 3/10; G01N 2203/001; G01N 2203/0039;
(Continued)

(56) References Cited

U.S. PATENT DOCUMENTS

| | | | | |
|---|---|---|---|---|
| 2,418,916 A | * | 4/1947 | Weaver ................... | G01N 3/42 73/81 |
| 4,144,740 A | * | 3/1979 | Beatty ...................... | G01N 3/56 73/104 |

(Continued)

FOREIGN PATENT DOCUMENTS

| | | |
|---|---|---|
| CN | 104155076 | 7/2016 |
| DE | 202006003466 | 5/2006 |

(Continued)

OTHER PUBLICATIONS

"Search Report of Europe Counterpart Application", dated Jul. 4, 2019, p. 1-p. 11.

*Primary Examiner* — Max H Noori
*Assistant Examiner* — Masoud H Noori
(74) *Attorney, Agent, or Firm* — JCIPRNET

(57) ABSTRACT

Provided are a striking device and a natural frequency measuring device capable of simply and accurately measuring a natural frequency of a system including force detector. The striking device includes an arm capable of swinging around a spindle, and a steel ball arranged in an end part of the arm on a side opposite to the spindle. The spindle is supported by a supporting part capable of lifting up and down relative to a post erected on a magnet stand. A
(Continued)

supporting part for supporting a supporting plate is arranged at a position in the post and above the supporting part. A permanent magnet is placed above the supporting plate. The steel ball falls down in an arc shape from a standby height position when the permanent magnet is removed.

8 Claims, 4 Drawing Sheets

(51) Int. Cl.
    *G01N 3/10* (2006.01)
    *G01M 7/08* (2006.01)
    *G01N 3/08* (2006.01)

(52) U.S. Cl.
    CPC .................. *G01N 2203/001* (2013.01); *G01N 2203/0039* (2013.01); *G01N 2203/0044* (2013.01); *G01N 2203/0482* (2013.01); *G01N 2203/0688* (2013.01)

(58) Field of Classification Search
    CPC ... G01N 2203/0044; G01N 2203/0482; G01N 2203/0688; G01M 7/08

USPC .......................................................... 72/833
    See application file for complete search history.

(56) References Cited

U.S. PATENT DOCUMENTS

| | | | | |
|---|---|---|---|---|
| 6,494,076 | B1* | 12/2002 | Gent | G01N 19/02 |
| | | | | 73/9 |
| 7,222,515 | B2* | 5/2007 | Hatanaka | G01N 3/303 |
| | | | | 73/12.01 |
| 2004/0074283 | A1* | 4/2004 | Withnall | G01M 7/08 |
| | | | | 73/12.12 |
| 2006/0005606 | A1 | 1/2006 | Hatanaka et al. | |
| 2006/0094571 | A1* | 5/2006 | Polidi | A63B 21/4047 |
| | | | | 482/94 |
| 2008/0236347 | A1* | 10/2008 | Spencer | B23D 45/042 |
| | | | | 83/13 |

FOREIGN PATENT DOCUMENTS

| | | |
|---|---|---|
| EP | 2887048 | 6/2015 |
| JP | 2006010409 | 1/2006 |

* cited by examiner

STRIKING DEVICE AND NATURAL FREQUENCY MEASURING DEVICE

CROSS-REFERENCE TO RELATED APPLICATION

The present application is related to and claims priority from Japanese patent application no. 2018-011638, filed on Jan. 26, 2018. The entire contents of the aforementioned application are hereby incorporated by reference herein.

BACKGROUND

Technical Field

The present disclosure relates to a striking device that is used to measure a natural frequency of a system including a force detector used in a material testing machine such as a high-speed tensile testing machine, and to a natural frequency measuring device using the striking device.

Related Art

The high-speed tensile testing machine has a configuration in which a tensile test force is applied by causing a moving side gripper to move at a high speed in a state that two ends of a test piece are gripped by the moving-side gripper and a fixed-side gripper (see patent literature 1, Japanese Laid-Open No. 2006-10409).

When a material test, such as the above-mentioned high-speed tensile test, a charpy impact test or the like, is conducted in which a test force is applied to the test piece in a short time, the natural frequency (natural vibration) of the force detector such as a load cell affects the test result. That is, when the natural frequency of the force detector is lower than the frequency generated in the test piece during the material test, resonance or vibration occurs easily during the test, and an inertial force thereof is superimposed on a measured value of the force measured by the force detector and causes a large error. Therefore, there are occasions that the natural frequency of the system including force detector such as the force detector and the gripper or the like is measured in advance before such a material test is conducted.

When the natural frequency is measured, a method is used in which the natural frequency is obtained in the following way, that is, the system including the force detector is struck by a hammer, or an impact is applied to the system including the force detector by dropping a steel ball (a falling ball method) to the system including the force detector, then an output of the force detector at this time is recorded and a FFT (Fast Fourier Transform) analysis or the like is performed on an output value.

When a natural frequency is measured, a problem is generated that measurement data is not fixed due to the strength of a striking force or the deviation in striking points or the like when a strike is conducted by the hammer. Besides, even when a falling ball method is used, there is a problem that not only does the deviation in collision points cause errors, but measurement operation also becomes complicated because the steel ball rolls after colliding with the system including the force detector.

The present disclosure is accomplished to solve the above problems, and is directed to provide a striking device and a natural frequency measuring device capable of simply and accurately measuring a natural frequency of a system including a force detector.

SUMMARY

The disclosure provides a striking device, which is used to measure a natural frequency of a system including a force detector used in a material testing machine. The striking device includes an arm capable of swinging around a spindle; a weight arranged in an end part of the arm on a side opposite to the spindle; and a weight fixing mechanism, fixing the weight at standby height position and causing the weight to fall down in an arc shape from the standby height position along with a swing of the arm by releasing the fixation at the standby height position. The system including force detector is struck by the weight toward a direction parallel to a load direction of a test force during a material test that is conducted by the material testing machine.

DESCRIPTION OF THE EMBODIMENTS

Figure 1:
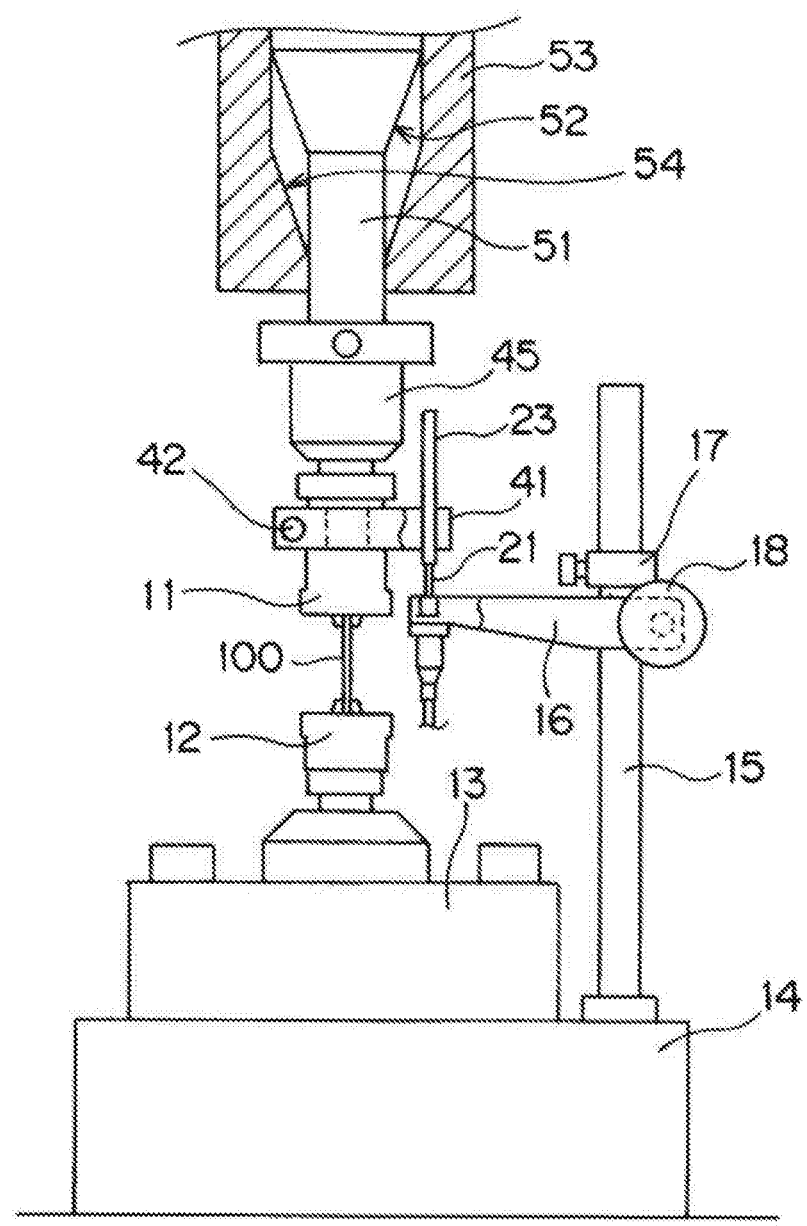
FIG. 1 is a schematic view showing a main part of a high-speed tensile testing machine using a striking device of the present disclosure.

An embodiment of the present disclosure is described below based on the drawings. FIG. 1 is a schematic view showing a main part of a high-speed tensile testing machine using a striking device of the present disclosure.

In the high-speed tensile testing machine, a test piece 100 is provided to a high-speed tensile test in a state that the upper and lower ends of the test piece 100 are gripped by a moving-side gripper 11 and a fixed-side gripper 12. The moving-side gripper 11 is supported at a lower end part of a moving member 51 via a coupling member 45. On the other hand, the fixed-side gripper 12 is fixed to a table 14 via a load cell 13 which is used as a force detector of the present disclosure.

The moving-member 51 which is connected to the moving-side gripper 11 via the coupling member 45 is disposed in a cavity formed within a piston 53 disposed above. A taper part 52 extending upward is formed in an upper end part of the moving member 51. On the other hand, a taper part 54 extending upward at a substantially same angle as the taper part 52 is formed in the lower end part of the cavity in the piston 53. Furthermore, the piston 53 is lifted up and down in a vertical direction by the drive of a hydraulic cylinder that is not illustrated. Therefore, when the piston 53 is lifted up at a high speed, after an approach zone before the taper part 52 in the moving member 51 and the taper part 54 in the piston 53 come into contact, the moving member 51 moves upward at a high initial speed along with the piston 53. In this way, a high-speed tensile load is applied to the test piece 100.

A displacement gauge for measuring an extension of the test piece 100 during the high-speed tensile test includes a moving body 23 and a fixed body 21. The moving body 23 is configured by a pipe made of a conductor, and the fixed body 21 is configured by a coil. Then, the displacement gauge has a configuration in which the change of an inductance of the fixed body 21 that is a coil caused by the movement of the moving body 23 is detected to calculate the extension of the test piece 100. A general strain gauge can also be used as the displacement gauge.

Here, the moving body 23 in the displacement gauge is coupled to the moving-side gripper 11 in a state of being supported by a supporting member 41. Besides, the fixed body 21 in the displacement gauge is supported by a supporting arm 16. The supporting arm 16 is configured to be capable of lifting up and down relative to a post 15 erected on the table 14, and to be fixed after adjusting a height position by actions of a positioning ring 17 and a fixing gripper 18.

When the piston 53 is lifted up at a high speed during the high-speed tensile test having the above configuration, the moving member 51 is lifted up at a high speed after passing through the approach zone of the piston 53. In this way, the high-speed tensile load is applied to the test piece 100 via the moving-side gripper 11. Then, the moving-side gripper 11 moves upward due to the extension of the test piece 100. Due to the movement of the moving-side gripper 11, an insertion amount of the coil used as the fixed body 21 into the pipe forming the moving body 23 in the displacement gauge is reduced, and the inductance changes. Then, the inductance is detected, and an amount of displacement of the displacement gauge, that is, the extension of the test piece 100 is calculated based on the change.

Figure 2:
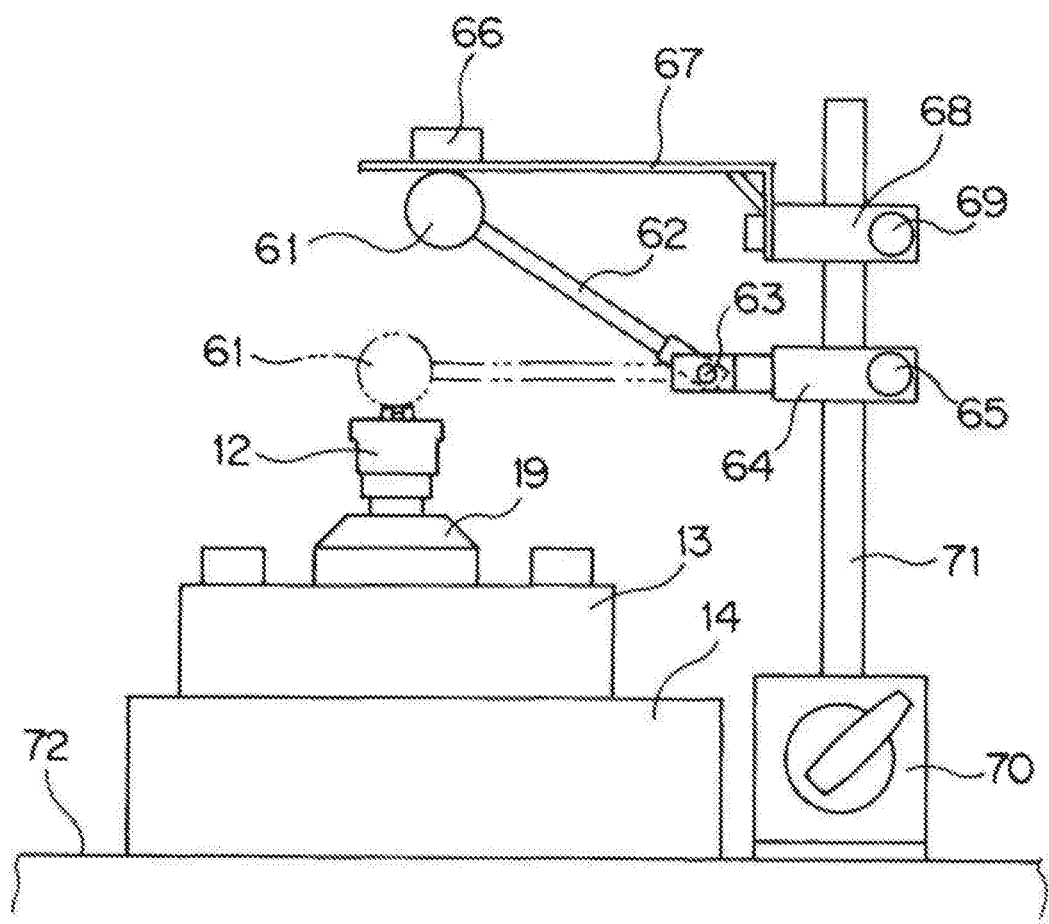
FIG. 2 is a schematic view of a striking device of the present disclosure.
Figure 3:
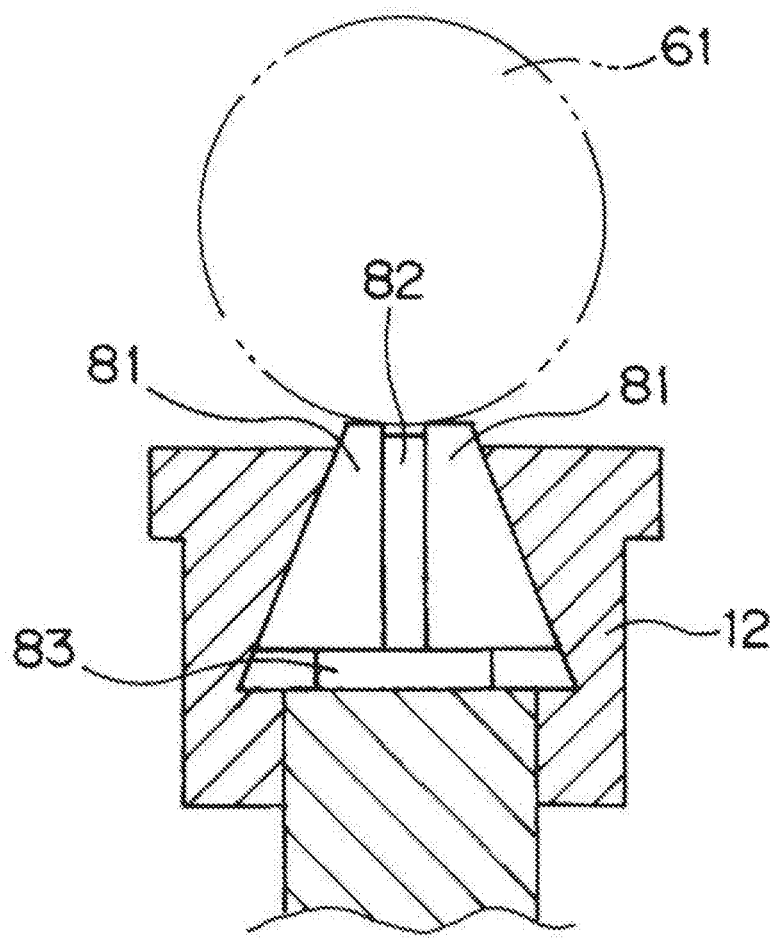
FIG. 3 is an enlarged cross-sectional view showing a state that a fixed side gripper 12 is struck by a steel ball 61.

Next, the configuration of the striking device of the present disclosure is described. FIG. 2 is a schematic view of the striking device of the present disclosure. Besides, FIG. 3 is an enlarged cross-sectional view showing a state that the fixed side gripper 12 is struck by a steel ball 61.

The striking device of the present disclosure includes an arm 62 capable of swinging around a spindle 63, and a steel ball 61 used as a weight which is arranged in an end part of the arm 62 on the opposite side of the spindle 63. The spindle 63 is supported by a supporting part 64 which is capable of lifting up and down with respect to a post 71 erected on a magnet stand 70. The supporting part 64 that supports the spindle 63 can be fixed in a position at any height of the post 71 by operating a screw 65. In addition, the magnet stand 70 is placed on a base 72 in this figure, but the magnet stand 70 may also be placed on the table 14.

A supporting part 68 that supports a supporting plate 67 is arranged in a position of the post 71 and above the supporting part 64. The supporting part 68 that supports the supporting plate 67 can be fixed in a position at any height of the post 71 by operating a screw 69. In addition, a permanent magnet 66 is placed above the supporting plate 67. As shown by a solid line in FIG. 2, when the steel ball 61 is disposed at a height position which is in contact with the lower surface of the supporting plate 67, the permanent magnet 66 fixes the steel ball 61 by a magnetic force in a standby height position which is in contact with the lower surface of the supporting plate 67. Then, when the permanent magnet 66 is removed from the state shown in FIG. 2, the steel ball 61 falls down in an arc shape from the standby height position shown by the solid line in FIG. 2 into a state shown by an imaginary line in FIG. 2. In addition, the supporting plate 67 is made of non-magnetic material such as aluminum, stainless steel or plastic.

Figure 4:
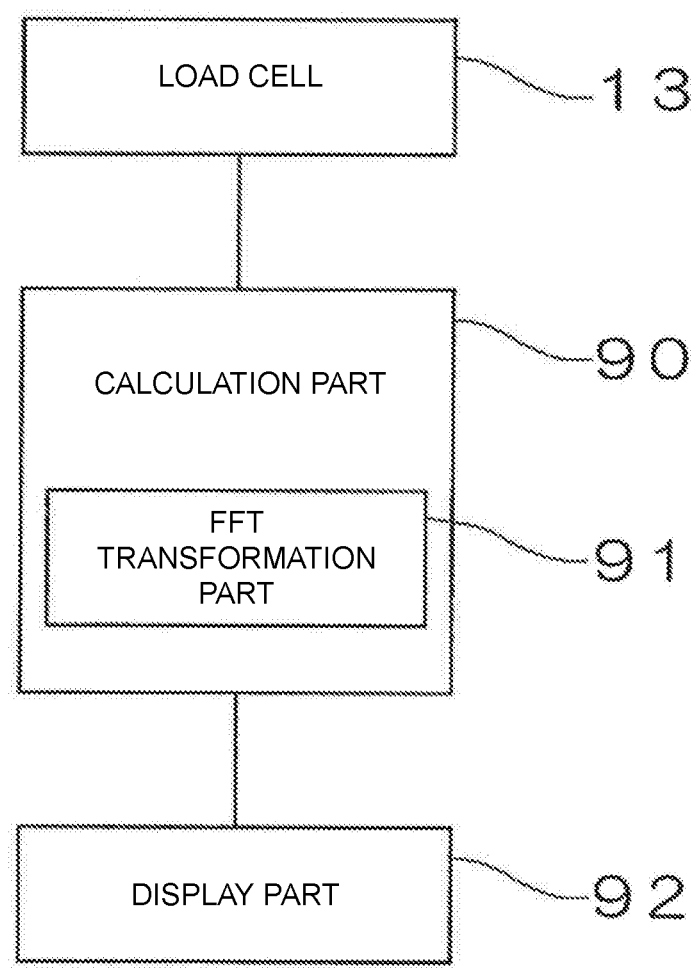
FIG. 4 is a block diagram showing a control measurement system including a calculation part 90 which is used along with the striking device of the present disclosure.

FIG. 4 is a block diagram showing a control measurement system including a calculation part 90 which is used along with the striking device of the present disclosure. The control measurement system may be configured as a part of the high-speed tensile testing machine shown in FIG. 1, or may be separately prepared for the measurement of natural frequency.

The calculation part 90 is connected to the load cell 13 and a display part 92 which is configured by a liquid crystal display panel or the like. The calculation part 90 is provided with an FFT transformation part 91 for performing a fast Fourier transform on a signal transmitted from the load cell 13. The fast Fourier transform is performed on the signal from the load cell 13 in the FFT transformation part 91, and the natural frequency of the system including the load cell 13 and the fixed-side gripper 12 is calculated in the calculation part 90. The calculated natural frequency is displayed in the display part 92.

When the natural frequency of the system including the load cell 13 serving as a force detector and the fixed-side gripper 12 is measured by the striking device having such a configuration, as shown in FIG. 3, a dummy test piece 82 is disposed on a supporting plate 83, and the dummy test piece 82 is gripped by a pair of grip teeth 81 in the fixed-side gripper 12. The reason for this is to cause the gripper 12 to vibrate integrally including the grip teeth 81 or the test piece 82, and to prevent a positional deviation from generating on the pair of grip teeth 81 when the pair of grip teeth 81 in the fixed-side gripper 12 described below collides with the steel ball 61. In addition, in FIG. 3, the steel ball 61 collides with the two grip teeth 81 at the same time, but it is an ideal situation. Actually, it is considered that the steel ball 61 usually collides with one grip tooth 81. There is no particular problem in the striking function even in this case. Besides, according to the material of the test piece 82, the leading end thereof may project a little above the grip teeth 81, making the steel ball 61 collide with the leading end of the test piece 82.

In this state, the position of the magnet stand 70 is adjusted and the height position of the supporting part 64 that supports the spindle 63 is adjusted, so that the lower surface of the steel ball 61 is in contact with the upper end of the fixed-side gripper 12 in a state that the arm 62 faces to a horizontal direction as shown by the imaginary line in FIG. 2. Besides, the supporting part 68 that supports the supporting plate 67 is arranged at a position height position at which the steel ball 61 may be arranged in a position suitable for striking. Then, as shown by the solid line in FIG. 2, by the action of the permanent magnet 66, the steel ball 61 is fixed in the standby height position that is in contact with the lower surface of the supporting plate 67.

In this state, the permanent magnet 66 is removed from the upper surface of the supporting plate 67. In this way, the steel ball 61 fixed in the standby height position is released from the fixation in the standby height position, and falls down in an arc shape along with an oscillation of the arm 62 around the spindle 63. Then, the steel ball 61 strikes the pair of grip teeth 81 in the fixed side gripper 12 toward a direction (the vertical direction in FIG. 2) parallel to the load direction of the test force during the material test that is conducted by the material testing machine shown in FIG. 1. Besides, the strike is also performed coaxially with the load shaft.

The vibration that is generated in the system including the load cell 13 and the fixed-side gripper 12 by the strike is measured by a force detecting function of the load cell 13. Then, the fast Fourier transform is performed, by the FFT transformation part 91 in the calculation part 90, on a detection signal of the vibration force detected by the load cell 13. In this way, the natural frequency of the system including the load cell 13 and the fixed-side gripper 12 is calculated. The calculated natural frequency is displayed in the display part 92.

In addition, the load cell 13 is not only connected to the fixed-side gripper 12, but also in contact with the table 14. However, a detection part such as a strain gauge for detecting the force in the load cell 13 is stored in a strain generating part existing in a region 19 shown in FIG. 2. The load cell 13 is divided into an upper part and a lower part by the strain generating part arranged inside. Because the strain generating part has the nature of spring, the vibration of the system including the fixed-side gripper 12 mainly occurs above the strain generating part. Therefore, the table 14 which is in contact with the load cell 13 does not affect the natural frequency of the system including the load cell 13 and the fixed side gripper 12.

As described above, according to the striking device of the present disclosure, by adjusting the arrangement of the magnet stand 70 that supports the post 71 and the height position of the supporting part 64 that supports the spindle 63, the same position of the fixed-side gripper 12 can be always struck by the steel ball 61. Besides, by adjusting the height position of the supporting part 68 that supports the supporting plate 67, the fixed side gripper 12 can be always struck with a fixed force by the steel ball 61. Therefore, a simple configuration is provided and the natural frequency of the system including the load cell 13 can be simply and accurately measured.

In addition, in the above-described embodiment, an effect of the magnetic force to the steel ball 61 is eliminated and the steel ball 61 falls down in an arc shape by removing the permanent magnet 66 from the upper surface of the supporting plate 67, but a configuration may also be adopted in which an electromagnet is used instead of the permanent magnet 66 and an electromagnetic force of the electromagnet is turned on/off. Besides, a configuration may be adopted in which the steel ball 61 is supported by a mechanical holding mechanism.

Besides, in the above-described embodiment, the present disclosure is applied in the high-speed tensile testing machine including an approach mechanism, but the approach mechanism is not always required according to a test speed. For example, the vibration may cause problems even when a test is conducted at a maximum speed in a static tensile testing machine, and thus the present disclosure can also be applied in this case.

OTHER CONFIGURATIONS

The disclosure recited in configuration 1 is a striking device, which is used to measure a natural frequency of a system including a force detector used in a material testing machine. The striking device includes an arm capable of swinging around a spindle; a weight arranged in an end part of the arm on a side opposite to the spindle; and a weight fixing mechanism, fixing the weight at standby height position and causing the weight to fall down in an arc shape from the standby height position along with a swing of the arm by releasing the fixation at the standby height position. The system including force detector is struck by the weight toward a direction parallel to a load direction of a test force during a material test that is conducted by the material testing machine.

The disclosure recited in configuration 2 is the striking device recited in technical solution 1, in which the system including force detector includes the force detector and a gripper connected to the force detector, and the weight strikes the gripper.

The disclosure recited in configuration 3 is the striking device recited in configuration 2, in which the spindle and the weight fixing mechanism are arranged to be capable of lifting up and down relative to a post erected in a vertical direction.

The disclosure recited in configuration 4 is the striking device recited in any one of configurations 1 to 3, in which the weight is configured by a magnetic body, and the weight fixing mechanism includes a magnet for fixing the weight at the standby height position by a magnetic force.

The disclosure recited in configuration 5 is a natural frequency measuring device which includes the striking device recited in any one of technical solutions 1 to 4; and a calculation part, calculating the natural frequency of the system including the force detector based on an output signal of the force detector when the system including force detector is struck by the weight.

According to the disclosure recited in configurations 1 to 5, the weight is made to fall down in an arc shape along with the swing of the arm to strike the system including the force detector toward a direction parallel to a load direction of a test force during a material test. Thus, a simple configuration is provided and the natural frequency of the system including the force detector can be simply and accurately measured.

According to the disclosure recited in configuration 3, the striking position of the weight can be changed corresponding to sizes of the force detector and the gripper.

According to the disclosure recited in configuration 4, the fixation of the weight and the release of the fixation can be easily conducted.

What is claimed is:

1. A striking device, measuring a natural frequency of a system comprising a force detector used in a material testing machine, the striking device comprising:
   an arm, capable of swinging around a spindle;
   a weight, arranged in an end part of the arm on a side opposite to the spindle; and
   a weight fixing mechanism, arranged above the force detector and fixing the weight at a standby height position and causing the weight to fall down in an arc shape from the standby height position along with a swing of the arm by releasing the fixation at the standby height position,
   wherein the system is struck by the weight in a vertical direction parallel to a load direction of a test force during a material test that is conducted by the material testing machine.

2. The striking device according to claim 1, wherein
   the system further comprises a gripper connected to the force detector, and
   the weight strikes the gripper.

3. The striking device according to claim 2, wherein
   the spindle and the weight fixing mechanism are arranged to be capable of lifting up and down relative to a post erected in the vertical direction.

4. The striking device according to claim 1, wherein
   the weight is configured by a magnetic body, and
   the weight fixing mechanism includes a magnet for fixing the weight at the standby height position by a magnetic force.

5. A natural frequency measuring device, comprising:
   the striking device, according to claim 1; and
   a calculation part, calculating the natural frequency of the system based on an output signal of the force detector when the system is struck by the weight.

6. The natural frequency measuring device according to claim 5, wherein the system further comprises a gripper connected to the force detector, and the weight strikes the gripper.

7. The natural frequency measuring device according to claim 6, wherein the spindle and the weight fixing mechanism are arranged to be capable of lifting up and down relative to a post erected in a vertical direction.

8. The natural frequency measuring device according to claim 5, wherein the weight is configured by a magnetic body, and the weight fixing mechanism includes a magnet for fixing the weight at the standby height position by a magnetic force.

\* \* \* \* \*